March 25, 1952 M. C. THOMPSON, JR 2,590,282

VARIABLE IMPEDANCE DEVICE

Filed Nov. 8, 1947

INVENTOR.
Moody C. Thompson Jr.

BY

Albert R. Hodges

ATTORNEY

Patented Mar. 25, 1952 2,590,282

UNITED STATES PATENT OFFICE 2,590,282

VARIABLE IMPEDANCE DEVICE

Moody C. Thompson, Jr., Washington, D. C., assignor to Stromberg-Carlson Company, a corporation of New York Application November 8, 1947, Serial No. 784,807

3 Claims. (Cl. 250—36)

This invention relates to high-frequency devices, and more particularly to a variable impedance device especially adapted for altering or varying one or more characteristics of a resonant circuit, as for example its resonant frequency or the ratio of its inductive reactance to its resistance. The latter ratio is frequently referred to as the "Q" of the resonant circuit.

It is an object of the present invention to provide an improved variable impedance device of simple construction and capable of a relatively wide range of variation.

Another object of the present invention is to provide an improved arrangement for suddenly or gradually altering one or more characteristics of a resonant circuit, such as its resonant frequency or its Q.

A further object of this invention is to provide an improved oscillation generator capable of sudden frequency shifts and hence especially adapted for use in multiplexing or coding in systems employing pulse time modulation.

Still another object of the present invention is to provide an improved variable-frequency signal generator.

In accordance with the present invention, there is provided a variable impedance device which comprises an electronic discharge device or vacuum tube having a cathode, a control electrode and an anode. An adjustable source of potential and a resistance element are connected in series between the anode and the cathode. A connection including a high-impedance element is provided between the control electrode and the cathode, and impedance-utilizing terminals are connected to this high-impedance element.

The present invention contemplates the use of the variable impedance device in accordance therewith in a variety of circuit combinations. For example, the variable impedance device may be associated with the resonant circuit of an oscillation generator in such a manner that the output frequency of the generator is variable over a relatively wide range merely by altering the potential applied to the anode of the vacuum tube forming the variable impedance device. Furthermore, the anode voltage may be suddenly changed to provide substantially instantaneous shifts in the output frequency of the signal generator, and these sudden changes in the anode voltage may be accomplished by the use of a trigger circuit, as for example one of the Eccles-Jordan type.

The variable impedance device of the present invention may also be advantageously employed in association with a resonant circuit to provide a tuned selective amplifier which is especially adapted for the amplification of pulse signals. In this embodiment, the variable impedance device is utilized automatically to reduce the Q of the resonant circuit immediately following the application of a pulse to the input circuit of the amplifier. Such a tuned selective amplifier is disclosed and claimed in divisional application Serial No. 145,618 filed February 23, 1950, and assigned to the same assignee as the present application.

The above and other objects of the present invention will be better understood by reference to the following description taken in connection with the accompanying drawings, in which like components are designated by like reference numerals and in which.

Figure 1:
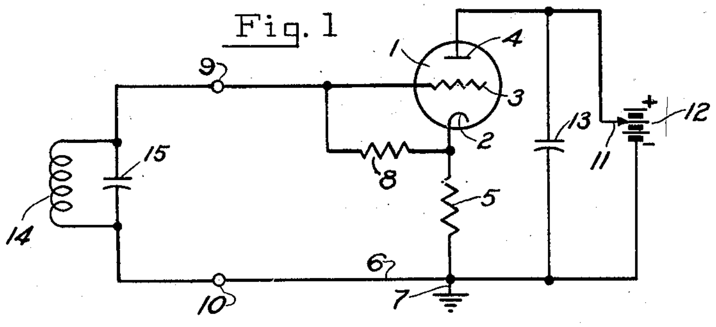
Fig. 1 is a schematic diagram of a variable impedance device in accordance with the present invention.

Referring now to Fig. 1 of the drawings, there is shown a variable impedance device comprising an electron discharge device or vacuum tube 1 having a cathode 2, a control electrode or grid 3, and an anode 4. Cathode 2 is connected by means of element 5, which may be a resistor, to a lead 6 which may be grounded as indicated at 7. A high-impedance element 8, which may be a resistor, is connected between grid 3 and cathode 2. Grid 3 is also connected to a first impedance-utilizing terminal 9. The second impedance-utilizing terminal 10 is connected to lead 6.

Anode 4 is connected to an adjustable or movable tap 11 on a source of potential such as battery 12, the negative terminal of which is connected to lead 6. A capacitor 13 is connected between anode 4 and lead 6. A resonant circuit comprising an inductor 14 shunted by a capacitor 15 is shown connected between terminals 9 and 10.

In operation, let it first be assumed that tap 11 is at the negative terminal of source 12, so that no potential is applied to anode 4 of vacuum tube 1. In this case, the impedance looking into terminals 9 and 10 from left to right comprises the vector sum of the impedance of element 8 and the impedance of element 5. Now let it be assumed that tap 11 is adjusted to a point on source 12 such that a positive potential is applied to anode 4. In this case, the impedance appearing between terminals 9 and 10 is a function of the mutual conductance of vacuum tube 1 and hence of its anode voltage, and is substantially different from the value previously realized.

By way of example, Fig. 1 shows a resonant circuit 14, 15 connected between terminals 9 and 10. By suitable choice of the circuit constants, the change in impedance between terminals 9 and 10 with a change in the anode potential applied to vacuum tube 1 may be made largely reactive, so that the resonant frequency of resonant circuit 14, 15 may be varied over a relatively wide range merely by adjusting the position of tap 11 on source 12. By another choice of the circuit constants the impedance may be made chiefly resistive, so that the damping and hence the Q of resonant circuit 14, 15 is changed over a relatively wide range with negligible effect upon the resonant frequency thereof. If desired, however, the circuit constants may be so chosen that both the Q and the resonant frequency of the tuned circuit are simultaneously varied in desired relative amounts.

It will be apparent, therefore, that the arrangement of Fig. 1 provides a simple and noncritical means for varying one or more characteristics of a resonant circuit between relatively wide limits. It will be understood that resonant circuit 14, 15 is shown in Fig. 1 merely as an example of one utilization arrangement of the present invention. It will be apparent to those skilled in the art that circuit arrangements other than a resonant circuit may equally well be connected between terminals 9 and 10, so that the impedance variations secured in accordance with the device of the present invention may be utilized for other purposes.

Figure 2:
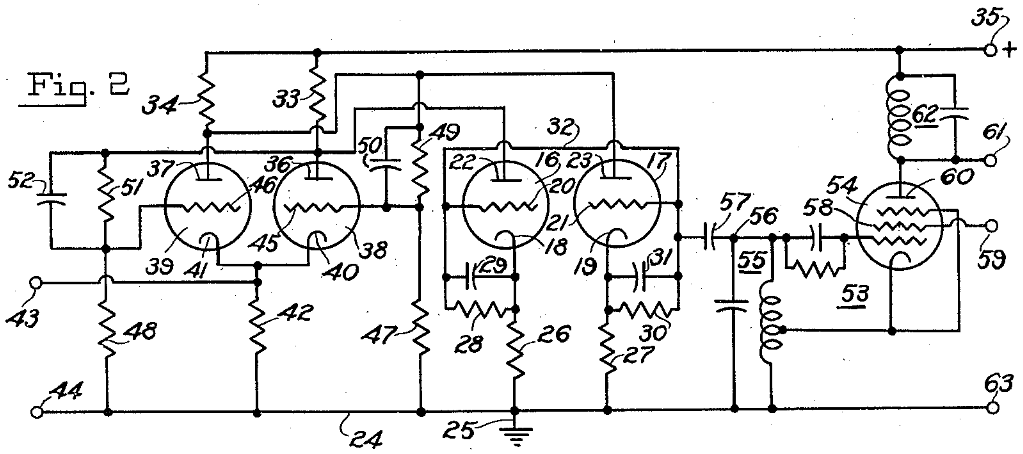
Fig. 2 is a schematic diagram of an oscillation generator capable of sudden frequency shifts and incorporating the variable impedance device of the present invention.

Fig. 2 shows an oscillation generator which is capable of sudden frequency shifts, and which is especially adapted for multiplexing or coding in a pulse time modulation system. Electron discharge devices or vacuum tubes 16 and 17 are provided, having respectively cathodes 18 and 19, control electrodes or grids 20 and 21, and anodes 22 and 23. Cathodes 18 and 19 are connected to a lead 24, which may be grounded as indicated at 25, respectively through resistors 26 and 27. A resistor 28 shunted by a capacitor 29 is connected between grid 20 and cathode 18 of vacuum tube 16. Similarly, a resistor 30 shunted by a capacitor 31 is connected between grid 21 and cathode 19 of vacuum tube 17. Grids 20 and 21 are connected together by a lead 32.

Anodes 22 and 23 of vacuum tubes 16 and 17 are connected respectively through resistors 33 and 34 to a source of positive potential indicated by terminal 35. Anodes 22 and 23 are also respectively connected to anodes 36 and 37 of a pair of electron discharge devices or vacuum tubes 38 and 39. Cathodes 40 and 41 of vacuum tubes 38 and 39 are connected together and, through a resistor 42, to lead 24. Input terminals 43 and 44 are connected respectively to the terminals of resistor 42.

Control electrodes or grids 45 and 46 respectively of vacuum tubes 38 and 39 are connected to lead 24 by resistors 47 and 48. A resistor 49 shunted by a capacitor 50 is connected between grid 45 of vacuum tube 38 and anode 37 of vacuum tube 39. A similar shunt network comprising a resistor 51 and a capacitor 52 is connected between grid 46 of vacuum tube 39 and anode 36 of vacuum tube 38.

An oscillator 53 is provided, comprising an electron discharge device 54 and a resonant circuit 55. The high-potential terminal 56 of resonant circuit 55 is coupled by capacitor 57 to commonly connected grids 20 and 21 of vacuum tubes 16 and 17. The screen-grid 58 of vacuum tube 54 is connected to a terminal 59. Anode 60 of vacuum tube 54 is connected to a terminal 61 and, through a resonant circuit 62, to the source of positive potential 35. The low-potential side of resonant circuit 55 is connected to lead 24, as is terminal 63.

In operation, oscillator 53 operates as an oscillation generator, the output of which is developed between terminals 61 and 63. If desired, the output of oscillator 53 may be pulse modulated by impressing a suitable modulation voltage between terminals 59 and 63. The frequency of oscillation depends not only upon the constants of resonant circuit 55, but also upon the values of capacitors 29 and 31. When vacuum tube 16 is provided with anode potential, the frequency of oscillation of oscillator 53 is determined partly by the value of capacitor 29. Likewise, if vacuum tube 17 is provided with anode potential, capacitor 31 becomes a factor in determining the frequency of oscillation of oscillator 53. If capacitors 29 and 31 have different values, oscillator 53 operates first at one frequency and then at another, depending upon which one of vacuum tubes 16 and 17 is supplied with anode potential.

In order to provide a sudden shift in frequency between these two values, means are provided for alternately energizing anodes 22 and 23 respectively of vacuum tubes 16 and 17. These means comprise vacuum tubes 38 and 39, which are connected and operates as a conventional Eccles-Jordan trigger circuit, that is, a direct-coupled multivibrator circuit with two conditions of stable equilibrium. When vacuum tube 38 is conductive, for example, there is a substantial potential drop across resistor 33, so that a relatively low potential is applied to anode 22 of vacuum tube 16. Hence capacitor 29 has practically no effect upon the frequency of oscillation. When vacuum tube 38 becomes non-conductive, the potential drop across resistor 33 becomes very small and the potential applied to anode 22 of vacuum tube 16 becomes substantially equal to that of source 35. Under this condition, the oscillation frequency is dependent upon the value of capacitor 29. The same situation exists with respect to capacitor 31, which is associated with vacuum tube 17. The instant at which frequency shift occurs may be controlled by introducing a trigger voltage between terminals 43 and 44.

Resistors 28 and 30, which serve to provide a direct-current return for grids 20 and 21, are so chosen that their values are relatively large compared with the capacitive reactance respectively of capacitors 29 and 31. The latter capacitors have capacitance values which are selected to provide the desired two values of frequency of oscillation of the generator 53. Capacitor 57 has in general a large value compared with that of the capacitor in resonant circuit 55. Resonant circuit 62 is designed to tune broadly enough adequately to pass each of the two oscillation frequencies.

It will be seen, therefore, that the arrangement of Fig. 2 is an oscillation generator capable of sudden frequency shifts which is relatively uncomplicated and hence well adapted for use in pulse modulation systems. In such applications, the intelligence signal from one source may be transmitted while the oscillator is operating at its first frequency and the intelligence signal from a second source may be transmitted during operation at the other frequency. It will be understood, of course, that more than two values of frequency may be employed, if desired, by providing a sufficient number of additional switching tubes and variable impedance devices, so that any desired number of separate intelligence signals may be multiplexed and sent over a single communication medium.

Figure 3:
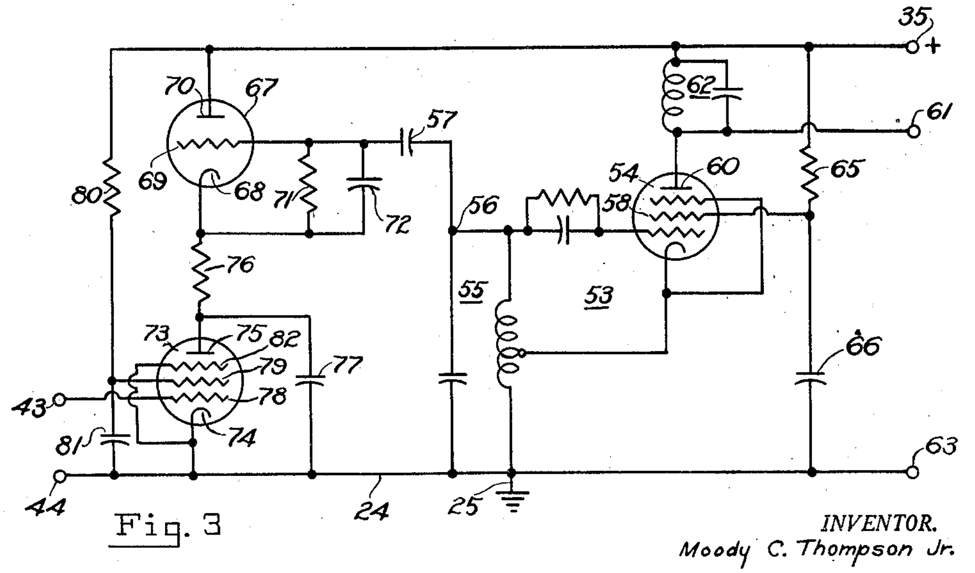
Fig. 3 shows schematically a variable-frequency signal generator embodying the variable impedance device of the present invention.

The variable-frequency generator of Fig. 3 employs an oscillator 53 comprising a vacuum tube 54 and a resonant circuit 55. These elements may be similar in design and operation to the correspondingly designated elements of Fig. 2. Screen-grid 58 of vacuum tube 54 is connected to the junction of a resistor 65 and a capacitor 66 which are connected in series between positive potential source 35 and lead 24.

In Fig. 3 there is shown an electron discharge device 67 having a cathode 68, a control electrode or grid 69 and an anode 70. A resistor 71 shunted by a capacitor 72 is connected between cathode 68 and grid 69. Grid 69 is coupled by means of capacitor 57 to the high-potential terminal 56 of resonant circuit 55. Anode 70 is connected to source of positive potential 35.

An electron discharge device 73, which may be a vacuum tube of the pentode type, has its cathode 74 connected to lead 24 and its anode 75 connected through a resistor 76 to cathode 68 of vacuum tube 67. A capacitor 77 is connected between cathode 74 and anode 75 of vacuum tube 73.

Control electrode 78 of vacuum tube 73 is connected to input terminal 43. Screen-grid 79 of vacuum tube 73 is connected to the junction of a resistor 80 and a capacitor 81 serially connected between positive potential source 35 and lead 24. The suppressor-grid 82 of vacuum tube 73 is connected directly to cathode 74.

In operation, vacuum tube 73 operates in such a manner that its anode current is a function of the voltage applied to its control electrode 78. If a modulating signal is applied between terminals 43 and 44, the mutual conductance of vacuum tube 73 is varied in accordance therewith. This in turn alters the current which flows through vacuum tube 67, so that the input capacitance of this vacuum tube, as developed across the high-impedance network comprising resistor 71 and capacitor 72, varies as a function of the modulating voltage.

By virtue of coupling capacitor 57, the variable input capacitance of vacuum tube 67 is effectively in shunt with resonant circuit 55. As a result, changes in this input capacitance cause corresponding changes in the frequency of oscillation of oscillator 53.

The values of the components of resonant circuit 55 determines the mean frequency of oscillation. Coupling capacitor 57 is made large compared with the value of the capacitor in resonant circuit 55. Resistor 71 provides a direct-current return path for control electrode 69 of vacuum tube 67, and its resistance is made large compared with the capacitance reactance of capacitor 72. The value of capacitor 72 is adjusted to provide the proper magnitude of frequency deviation. The value of resistor 76 depends upon the type of tube used at 67 and upon the positive potential of source 35. The capacitance reactance of capacitor 77 must be small at the mean frequency of oscillation of oscillator 53, but must be substantial at the frequency of the modulation voltage.

It will be apparent that the arrangement of Fig. 3 is a variable-frequency oscillation generator which is capable of producing a high-frequency signal that may be modulated over a relatively wide range merely by the application of a suitable modulating voltage to input terminals 43 and 44. This frequency modulation is continuous, and is accomplished with a minimum effect upon the amplitude of the output signal appearing between output terminals 61 and 63.

While there has been described what is at present considered the preferred embodiment of the present invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:

1. A variable-frequency oscillation generator comprising a resonant circuit associated with a first electron discharge device to form a high-frequency oscillator; a second electron discharge device having a cathode, a control electrode, and an anode; a source of potential, a third electron discharge device, and a resistance element connected in series between said anode and said cathode; a connection including a high-impedance element between said control electrode and said cathode; and means for connecting said high-impedance element effectively in shunt with said resonant circuit; whereby the frequency of oscillation of said high-frequency oscillator is a function of the resistance of said third electron discharge device.

2. A variable-frequency oscillation generator comprising a resonant circuit associated with a first electron discharge device to form a high-frequency oscillator; a second electron discharge device having a cathode, a control electrode, and an anode; a source of potential, a third electron discharge device, and a resistance element connected in series between said anode and said cathode; a connection including a high-impedance element between said control electrode and said cathode; means for coupling said control electrode to the high-potential side of said resonant circuit; and a connection between the low-potential side of said resonant circuit and the junction of said source of potential and said third electron discharge device; whereby the frequency of oscillation of said high-frequency oscillator is a function of the voltage of said potential source.

3. An oscillation generator comprising a resonant circuit associated with first electron discharge means to form a high-frequency oscillator; a source of frequency-control voltage; second electron discharge means connected effectively in shunt with said resonant circuit and controllable to alter the resonant frequency of said generator; and third electron discharge means connected effectively in series with said second electron discharge means, whereby said third electron discharge means is adapted to control the current flowing in said second electron discharge means in response to changes in said frequency-control voltage.

MOODY C. THOMPSON, Jr.

REFERENCES CITED

The following references are of record in the file of this patent:

UNITED STATES PATENTS

| Number | Name | Date |
|---|---|---|
| 1,777,410 | Jones | Oct. 7, 1930 |
| 1,917,394 | Roberts | July 11, 1933 |
| 2,234,461 | Tubbs | Mar. 11, 1941 |
| 2,266,096 | Timmer | Dec. 16, 1941 |
| 2,288,375 | Townsend | June 30, 1942 |
| 2,321,269 | Artzt | June 8, 1943 |
| 2,323,598 | Hathaway | July 6, 1943 |
| 2,350,171 | Lawrence | May 30, 1944 |
| 2,394,933 | Mueller et al. | Feb. 12, 1946 |